3,819,650
ORGANOPHOSPHORUS BENZOFURAN AND
BENZOTHIOPHENE COMPOUNDS
Kurt Hofer, Munchenstein, Basel-Land, and Guenther
Tscheulin, Riehen, Basel-Land, Switzerland, assignors
to Sandoz Ltd. (also known as Sandoz AG), Basel,
Switzerland
No Drawing. Filed Mar. 27, 1972, Ser. No. 238,640
Claims priority, application Switzerland, Apr. 2, 1971,
4,864/71
Int. Cl. C07d 5/44, 63/24
U.S. Cl. 260—329.3
27 Claims

ABSTRACT OF THE DISCLOSURE

The invention provides novel compounds of formula I,

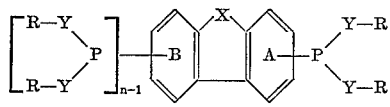

in which n is 1 or 2, X is a sulphur or oxygen atom, the Y's independently signify oxygen, sulphur, imino or alkyl- or cycloalkyl-imino, and the R's independently signify a hydrocarbon radical consisting of aromatic and/or saturated aliphatic units, and the rings A and/or B may optionally contain an alkyl substituent. The compounds are useful as stabilisers for organic materials against light, heat and oxygen. The invention also provides the novel intermediates of formula II,

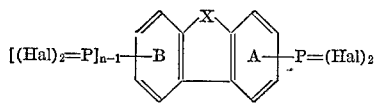

in which n, X and the rings A and B are as defined above and Hal signifies a chlorine or bromine atom.

This invention relates to organophosphorus compounds, their preparation and their use for the stabilisation of organic materials.

The invention provides compounds of formula I,

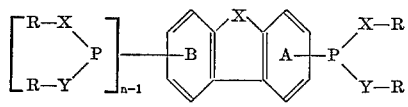

in which n is 1 or 2,

X is an oxygen or sulphur atom, preferably an oxygen atom, the Y's, which may be the same or different, each signifies an oxygen or sulphur atom, or an imino radical, a lower alkylimino radical of up to 6 carbon atoms or a cycloalkylimino radical of 5 to 6 ring carbon atoms, the R's, which may be the same or different, each signifies a hydrocarbon radical of up to 24 carbon atoms consisting of aromatic units of up to 12 carbon atoms and/or saturated aliphatic units of up to 18 carbon atoms, preferably of 4 to 12 carbon atoms, in which aliphatic units one or more C—C bonds may be replaced by C—O—C bonds, and the rings A and/or B may optionally contain an alkyl substituent of up to 12 carbon atoms, preferably 1 to 4 carbon atoms, but are preferably unsubstituted.

In accordance with the invention, the compounds of formula I may be prepared by a process comprising condensing a compound of formula II,

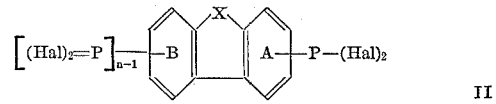

in which n, X and the rings A and B are as defined above, and Hal signifies a chlorine or bromine atom, with a compound or mixture of compounds of formula III,

in which Y and R are as defined above.

It will be appreciated that, in the condensation reaction, the formation of a compound of formula I in which n is 1 results from the reaction of 2 moles of the compound of formula III or mixture thereof per 1 mole of the compound of formula II, whereas the formation of a compound of formula I in which n is 2 results from the reaction of 4 moles of the compound of formula III or mixture thereof per mol of the compound of formula II. Therefore, quantities of at least 2 or 4 moles, respectively, of the compound of formula III or mixture thereof per mole of the compound of formula II should be employed in the process.

The reaction of the starting materials of formulae II and III generally proceeds smoothly, but occasionally external cooling is necessary to reduce the vigor of the reaction and so prevent side-reactions. Phenols of formula III generally react smoothly with heating, e.g. at 100–150° C., the hydrogen halide split off escaping in the reaction vessel. If desired, acid-binding agents such as pyridine or trialkylamine can be added to bind the hydrogen halide. This alternative is preferred when using alcohols of formula III. If the compounds of formula II are reacted with amines of formula III, normally an excess of the amine is employed to bind the hydrogen halide split off in the reaction.

This condensation reaction is of a generally known type, cf. K. Sasse, "Methoden der Organische Chemie," 4th impression (1963), vol. XII/I, Part 1, page 318 et seq.

The starting materials of formula II, which are believed to be novel, may be prepared by reacting a compound of formula IV,

in which X and the rings A and B are as defined above, with a compound of formula V,

in which Hal is as defined above, preferably a chlorine atom.

While this reaction can be carried out at very high temperatures in the gaseous phase, to reduce side reactions it is generally more advantageous to carry it out under milder conditions using a catalyst. Friedel-Crafts catalysts are suitable, in particular anhydrous aluminium chloride. It is preferable to work with phosphorus trichloride in excess at its boiling temperature. Before the reaction mixture is worked up, the complex formed by the aluminium chloride with the liberated chlorophosphine must first be decomposed, using for example phosphorus oxychloride or pyridine. Whether substitution of one or both of rings A and B occurs is dependent primarily on the amount of Friedel-Crafts catalyst used. The principles underlying these types of reaction are known. Such and analogous procedures for known compounds are described in the cited work of K. Sasse at pages 302–318.

It is to be appreciated that the compounds of formula II are normally obtained as a mixture. When rings A and B in the compound of formula IV are unsubstituted, as is preferred, and in the reaction only one of the rings is substituted with a —PHal$_2$ radical, in general it can be stated that this mixture consists primarily of the compound where the —PHal$_2$ substituent is in the para position to —X—. However, significant amounts of the compound where the —PHal$_2$ substituent is in the ortho position to —X— are normally also present. Very minor amounts of the compounds containing the —PHal$_2$ substituent in one or the other of the two two remaining free positions of the ring may also be present. Similar considerations apply when both rings contain a —PHal$_2$ substituent, but some modification of the proportions may occur when one or both rings contain an alkyl constituent. It will be appreciated that if these mixtures of compounds of formula II are reacted to give compounds of formula I, the compounds of formula I have obtained as corresponding mixtures. However, these mixtures function satisfactorily as stabilisers of organic materials in accordance wih the invention and separation of the individual components is not considered worthwhile.

The following alkyl, cycloalkyl, alkylcycloalkyl and cycloalkylalkyl substituents are suitable as radicals R in compounds of formula I: methyl, ethyl, propyl, butyl, isobutyl, amyl, 2,2-dimethylpropyl, octyl, dodecyl, docosyl, iso-propyl, tert.butyl, 2-ethylbutyl, 3-methylpentyl, 4-methyl-2-pentyl, 2,4-dimethylpentyl, 5-methyl-3-hexyl, 2-ethylhexyl, 2,2,4-trimethylpentyl, 2,6-dimethyl-4-heptyl, 4-methyl-2-propylpentyl, 6-ethyl-3-octyl, 3,7-dimethyloctyl, 2-methyl-4-nonyl, 6-undecyl, 2,2-dimethyl-1-decyl, 2,6,8-trimethyl-4-nonyl, cyclopentyl, cyclohexyl, 2-cyclohexylethyl, 4-methyl-cyclohexyl, 2,5-, 2,6-, 3,4- and 3,5-dimethyl-cyclohexyl, cycloheptyl and cyclododecyl. The radicals R may also stand for aryl radicals, in particular phenyl or biphenyl, or hydrocarbon radicals consisting of aromatic and saturated aliphatic units, i.e. alkaryl and aralkyl. Examples of these latter radicals are 2-, 3- and 4-methylphenyl, dimethyl-phenyl (mixture of isomers), tert. butylphenyls, p-octylphenyl, p-nonylphenyl, (bis-octyl)-phenyl, benzyl and phenylethyl, especially p-nonyl- and p- and 2,4-tertiary-butyl-phenyls. In such hydrocarbon radicals single C—C bonds may be replaced by C—O—C bonds, i.e. by ether bridges. Examples of corresponding such radicals are 2 - methylethyl, 2 - methoxypropyl, 2-phenoxy-ethyl, 2-(2'-phenoxyethoxy)-ethoxy, 2-cresoxy-ethyl, 4-butoxyphenyl and substituents of formula $$CH_3(OCH_2CH_2)_x—,$$

where $x$ represents an integer from 2 to 12.

In a particular phosphorus-containing substituent, the two R's are preferably identical and aryl-containing R's are preferred over aliphatic R's.

For the bridging radicals Y in the phosphorus-containing substituents, —O— bridges are preferred over —S— bridges, which in turn are preferred over nitrogen-containing bridges. The Y's in a particular substituent are preferably the same, so that in general VI is preferred over VII which is preferred over VIII which is preferred over nitrogen-containing substituents.

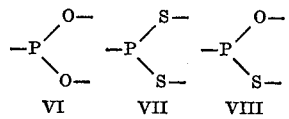

VI    VII    VIII

When ring A and/or B is alkyl substituted, suitable substituents include methyl, ethyl, isopropyl, butyl, tertiary butyl, hexyl, 2-ethylhexyl, 1,1,3,3-tetramethylbutyl, nonyl and dodecyl.

As already indicated, the compounds of formula I are useful as stabilisers for organic materials. For this purpose they may be incorporated in materials sensitive to the action of light, heat and oxygen, or applied to such materials as a protective surface film, to reduce degradation of the materials. The compounds have numerous applications in the plastics sector, being suitable, for example, for the stabilization of cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamine-formaldehyde and urea-formaldehyde resins, allyl casting resins, epoxy resins, polymethyl methacrylate, polyesters, and polyacrylonitrile. The compounds can also be used to stabilize natural products such as rubber, cellulose, wool and silk.

The materials to be protected may be in the form of film, sheeting, rod, strip, panelling, tapes, fibres, granules, powders, other processing forms, or as solutions, emulsions or dispersions. The compounds are incorporated in or coated on the materials by known methods. One important method of application consists in intimate mixing of the selected compound with the material to be protected, for instance polypropylene granules, in a kneader or other suitable machine, with subsequent extrusion. Homogeneous blending is achieved in this way, which is important for good protection. The material can be extruded in the form of film, tubing or filament, the latter for further processing as textile fabric. In this method of application the stabilizer is incorporated in the polypropylene before it is converted into textiles. Alternatively, textile yarns and fabrics can be treated with the new stabilizers, for example by application from ultrafine aqueous dispersion. This method is especially suitable for textiles of polyethylene terephthalate and cellulose acetate fibres.

Synthetic polymeric materials need not necessarily be in the final state when the new compounds are incorporated for protection. These can be mixed with the monomers or prepolymers prior to the synthesis of the final polymer.

The new stabilizers are suitable protective additives for clear films and opaque and semi-opaque and translucent materials having a surface sensitive to ultra-violet radiation, heat and atmospheric oxygen. Examples of such materials include foam plastics, opaque films and coatings, opaque papers, opaque and transparent coloured plastic products, fluorescent pigment, automobile and furniture polishes, creams and lotions.

Benzenephosphonic esters and their stabilizing action are known from the literature, e.g. Belgian Pat. 724,802. The present compounds, however, have a relatively low volatility and tendency to migrate and are relatively highly soluble in many materials requiring protection. Moreover, the compounds of the invention absorb ultra-violet radiation and thus provide protection against the destructive action of sunlight as well as against heat and oxygen. It is nevertheless often of advantage to aply the new stabilizers in combination with ultra-violet absorbers and/or stabilizers of other types. Such mixtures of active substances frequently exercise synergistic action and protect the treated materials particularly effectively against ultra-violet radiation, heat and oxidative degradation.

As stated above, the present compounds can be used as stabilizers for a wide variety of organic materials. Depending on the nature and the number of the substituents, the level of suitability for a given compound is greater or less. For example, the following relations have been found to exist between organic materials: compounds containing one or more aliphatic or cycloaliphatic radicals, containing at least 6, preferably 8 to 20 carbon atoms, are especially suitable for use in polypropylene; compounds bearing aryl radicals as the substituents R, which may be substituted by lower alkyl radicals, are suitable for the protection of polyvinyl chloride; and compounds having several ether groups in the substituents R are suitable for the protection of polyesters and polyamides. This invention comprises organic materials containing compounds of formula I as stabilisers. As indicated by the few instances mentioned above, they can be incorporated in the materials at any stage of processing or applied as a protective film using known methods. The amounts used may vary within wide limits, e.g. from 0.01 to 5% or preferably 0.05 to 1% in relation to the weight of the material.

The following Examples, in which parts and percentages are by weight, temperatures are in degrees centigrade and λmax. is the wavelength of maximum light absorption, further illustrate the invention:

EXAMPLE I (COMPOUNDS OF FORMULA II)

(a) A solution of 50.4 parts of diphenylene oxide, 165 parts of phosphorus trichloride and 53 parts of aluminium chloride is reacted for 3 hours with heating and reflux in the absence of moisture. Subsequently 61.3 parts of phosphorus oxychloride are added, and after continued stirring for 15 minutes the reaction mixture is cooled to 0°, on which the AlCl$_3$—POCl$_3$ complex formed settles out in granular form. It is separated by filtration and washed well with chlorobenzene. The filtrate is evaporated to dryness with vacuum. A mixture of dibenzofuryl-dichlorophosphines of formula IX.

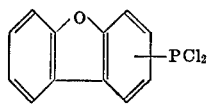

is obtained in the form of pale yellow crystals, M.P. 72–74°.

(b) If the amount of aluminium chloride in (a) is increased to 106 parts and that of phosphorus oxychloride to 122.6 parts, a mixture of dibenzofuryl-bis-dichlorophosphines of formula X

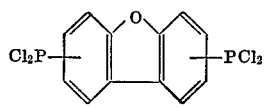

is obtained in the form of a dark red oil.

(c) In a similar manner to (a) but using diphenylene sulphide in place of diphenylene oxide, a mixture of the analogous sulphur—containing compounds is obtained.

(d) In a similar manner to (b) but using diphenylene sulphide in place of diphenylene oxide, a mixture of the analogous sulphur-containing compounds is obtained.

EXAMPLE II (COMPOUNDS OF FORMULA I)

(a)

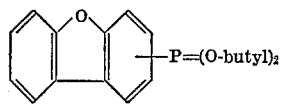

In the absence of moisture, a solution of 33.4 parts of the product of Example I(a) in 100 parts of toluene is added at 0–5 to 18.4 parts of butanol and 25.5 parts of triethylamine in 100 parts of toluene. The reaction is allowed to proceed overnight at 40°. Afterwards the precipitated salt is separated by filtration and the filtrate concentrated by evaporation with vacuum until a pale yellow oil is obtained λmax.=288 (nm.)

(b)

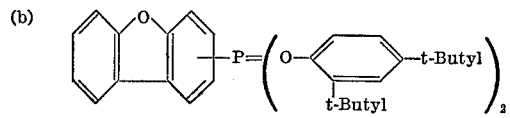

A solution of 32.5 parts of the product of Example I(a) in 100 parts of toluene is added to 49.9 parts of 2,4-di-tert. butylphenol and 24.3 parts of triethylamine in 200 parts of toluene at 0–5° in the absence of moisture. The mixture is allowed to react overnight at 40°, the precipitated salt filtered off, the filtrate concentrated by evaporation with vacuum, and the residue crystallized from petroleum ether. M.P. 186–187° λmax.=289 (nm.)

(c)

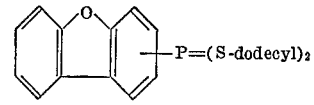

In the absence of moisture, a solution of 38 parts of the product of Example I(a) in 100 parts of toluene is added at 0–5 to 57 parts of dodecyl mercaptan and 28.5 parts of triethylamine in 200 parts of toluene. The mixture is allowed to react overnight at 40°, the precipitated salt then separated by filtration and the filtrate concentrated by evaporation with vacuum; the residue is crystallized from ether/methanol. M.P. 45–46°, λmax.=289 (nm.)

(d)

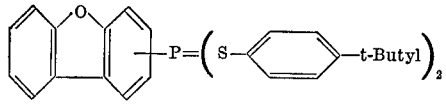

A solution of 58.6 parts of the product of Example I(a) in 100 parts of toluene is added at 0–4° to 72.5 parts of 4-tert. butylthiophenol and 44.5 parts of triethylamine in 200 parts of toluene, the mixture allowed to react overnight at 40°, the precipitated salt filtered off, the filtrate concentrated by evaporation in vacuum, and the residue crystallized from ether/petroleum ether. M.P. 102–104°, λmax.=291 (nm.)

(e)

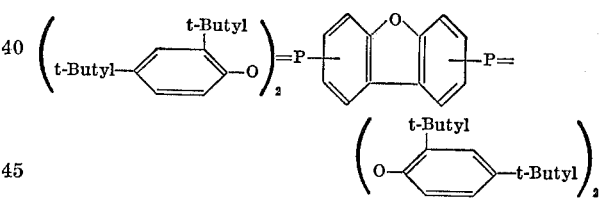

In the absence of moisture, a solution of 84.2 parts of the product of Example I(b) in 100 parts of toluene is added at 0–5° to 187.4 parts of 2,4-di-tert. butylphenol and 91.9 parts of triethylamine in 300 parts of toluene. The mixture is allowed to react overnight at 40°, then the precipitated salt is separated by filtration and the filtrate concentrated by evaporation with vacuum. A red oil is obtained. After chromatographic purification over a column, white crystals of M.P. 65–67° are obtained. λmax.=288 (nm.).

(f)

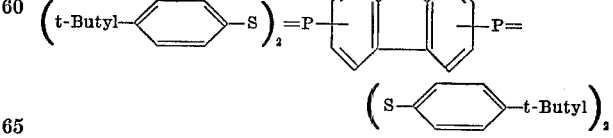

In the absence of moisture, a solution of 87 parts of dibenzofuryl-bis-dichlorophosphine in 100 parts of toluene is added at 0–5° to 156 parts of 4-tert. butyl thiophenol and 95 parts of triethylamine in 300 parts of toluene. The mixture is allowed to react overnight at 40°, the precipitated salt filtered off, the filtrate concentrated by evaporation with vacuum and the residue crystallized from acetone/petroleum ether. M.P. 112–113°. λmax.=290–300 (nm.).

In an analogous manner to (a) to (d) but using appropriate compounds of formula III, there are obtained the following products:

in the Table below. The number of minutes in the final column is the time taken for the excess pressure to fall to zero.

|   | | M.P. | Max. (nm.) |
|---|---|---|---|
| (g) | 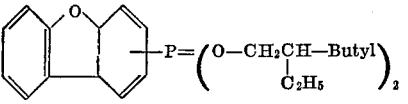 | Oil | 286 |
| (h) | 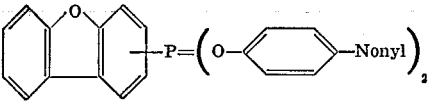 | Oil | 289 |
| (i) | 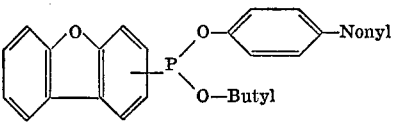 | Oil | 288 |
| (j) | 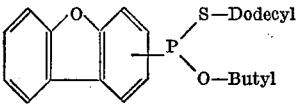 | Oil | 289 |
| (k) | 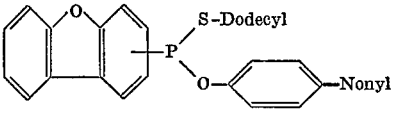 | Oil | 289 |
| (l) | 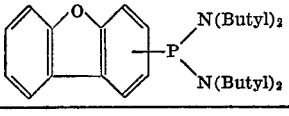 | Oil | 290 |

The products in (i), (j) and (k) are obtained using mixtures of compounds of formula III. While the major components are as indicated by the formulae in the Table, as well as appreciated minor amounts of compounds where each of the ester radicals is derived from one or the other compound of formula III are also present.

In analogous manner to (a) above, but using the product of Example I(c) in place of the produce of Example I(a), there is obtained the product

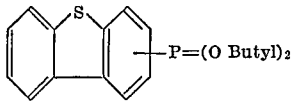

which is an oil having a λmax. of 295 (nm.).

EXAMPLE III

A. Stabilization against oxidative degradation

Various products in accordance with the invention were tested for effectiveness as stabilizers against the action of oxygen, the test method being as follows.

The product under test was homogeneously incorporated in polypropylene containing as antioxidant 0.2% of 4,4'-methylene-bis-(2,6 - di-tert. butylphenol). The polypropylene was moulded in the form of thin tiles. These were stored under oxygen in a closed system from which the air had been previously expelled. The temperature was increased to 190°, which gives rise to an excess pressure of approximately 20 mm. Hg. Oxidation of the polymer leads to a decrease in pressure, the rate of the pressure decrease being low when the effectiveness of the stabilizer or stabilizer mixture is high. The test results are set out

| Stabilizer content of the polypropylene | | | |
|---|---|---|---|
| 4,4'-methylene-bis-(2,6-di-tert. butylphenol), percent | Compound of formula (I) | | Minutes |
| | Percent | Product of Example No. | |
| 0.2 | | | 119 |
| 0.2 | 0.1 | II(a) | 312 |
| 0.2 | 0.1 | II(b) | 415 |
| 0.2 | 0.1 | II(c) | 256 |
| 0.2 | 0.1 | II(d) | 247 |

B. Stabilization against brown discoloration

Polypropylene in which 0.2% of the stabilizer 2,2'-methylene-bis-(4-methyl-6-tert. butylphenol) has been incorporated undergoes brownish discoloration at around 220°. It was found that the appearance of the discoloration is retarded or prevented if in addition 0.1% of a product of Example II is also incorporated.

In the ageing test carried out in a drying oven at 140°, polypropylene tiles show pronounced brownish discoloration after only one day if only 0.2% of 2,2'-methylene-bis-(4-methyl-6-tert. butylphenol) is present for protection. If in addition 0.1% of one of the products of Example II is incorporated in the polymer, the tiles withstand 4 days' exposure at 140° without discoloration.

What is claimed is:

1. A compound of the formula

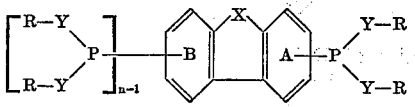

in which n is 1 or 2,

X oxygen or sulphur, each Y is, independently, oxygen, sulphur, imino, lower alkylimino of up to 6 carbon atoms or cycloalkylimino of 5 to 6 ring carbon atoms, each R is, independently, a hydrocarbon radical of up to 24 carbon atoms selected from the group consisting of alkyl, cycloalkyl, cycloalkylalkyl, alkylcycloalkyl, aryl, alkaryl and aralkyl, 2-methoxyethyl, 2-methoxypropyl, 2-phenoxyethyl, 2-(2′-phenoxyethoxy)-ethoxy, 2-cresoxyethyl, 4-butoxyphenyl or a substituent of the formula $CH_3(OCH_2CH_2)_x$— where $x$ represents an integer from 2 to 12, and the rings A and B are each, independently, unsubstituted or substituted by an alkyl of up to 12 carbon atoms.

2. A compound according to Claim 1, wherein each R is, independently, biphenyl, p-nonylphenyl, p-tertiary butylphenyl, or 2,4-di-tertiary butylphenyl.

3. A compound of Claim 1, wherein rings A and B contain no alkyl substituents.

4. A compound of Claim 1, wherein X is oxygen.

5. A compound of Claim 1, wherein the Y's are all oxygen.

6. A compound of Claim 1, wherein the Y's are all sulphur or oxygen and sulphur.

7. A compound of Claim 1, wherein the R's are identical.

8. A compound of Claim 1, wherein each R is alkaryl.

9. A compound of Claim 1, which is of formula

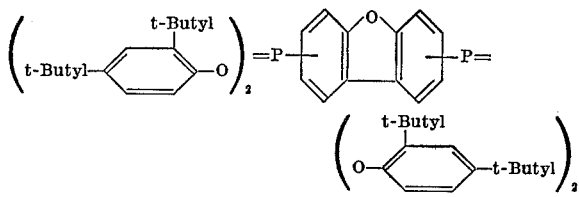

10. A compound of Claim 8, which is of formula

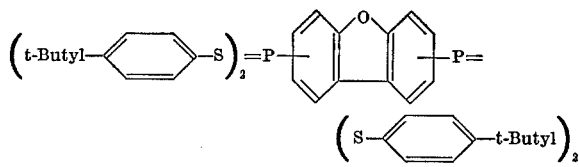

11. A compound of Claim 8, which is of formula

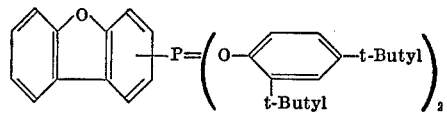

12. A mixture of compounds of Claim 8, of the formula

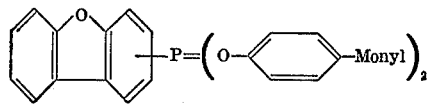

13. A compound of Claim 1, which is of formula

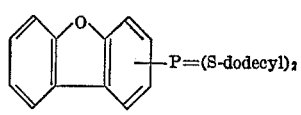

14. A mixture of compounds of Claim 1, of the formula

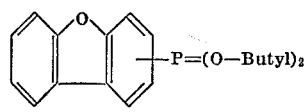

15. A compound of Claim 8, which is of formula

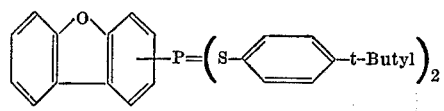

16. A compound of Claim 9, in which the phosphorus-containing substituents are each in the para position to the —O— radical.

17. A compound of Claim 10, in which the phosphorus-containing substituents are each in the para position to the —O— radical.

18. A compound of Claim 11, in which the phosphorus-containing substituent is in the para position to the —O— radical.

19. A compound of Claim 13, in which the phosphorus-containing substituent is in the para position to the —O— radical.

20. A compound of Claim 15, in which the phosphorus-containing substituent is in the para position to the —O— radical.

21. A compound of the formula

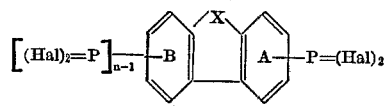

in which n is 1 or 2, x is sulphur or oxygen,

Hal is a chlorine or bromine atom, the rings A and B are each, independently, unsubstituted or substituted by an alkyl of up to 12 carbon atoms.

22. A compound of Claim 21 which is of formula

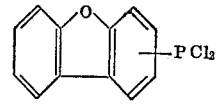

23. A mixture of compounds of Claim 21, of the formula

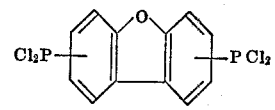

24. A mixture of compounds of Claim 21, of the formula

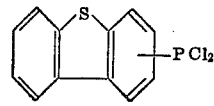

25. A mixture of compounds of Claim 21, of the formula
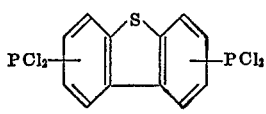
26. A mixture of position isomers of the formula
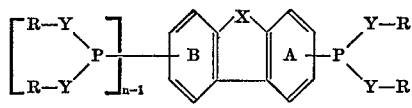
wherein X, Y, R, A, B, and $n$ are as defined in Claim 1.
27. A mixture of position isomers of the formula
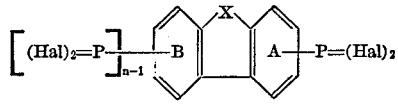
wherein Hal, X, A, B and $n$ are as defined in claim 21.
References Cited
UNITED STATES PATENTS
3,360,528   12/1967   Ribka _____ 260—315
JOHN D. RANDOLPH, Primary Examiner
C. M. S. JAISLE, Assistant Examiner
U.S. Cl. X.R.
8—128 R; 106—14, 176; 162—160; 252—8.6, 8.9, 402, 403, 406, 407; 260—45.8, 346.2 M, 814